United States Patent
Sandell et al.

(10) Patent No.: US 6,879,437 B2
(45) Date of Patent: Apr. 12, 2005

(54) GAIN CONTROL IN OPTICAL AMPLIFIERS

(75) Inventors: Johan Sandell, Enskede (SE); Edgard Goobar, Stockholm (SE); Sven Wingstrand, Älvsjö (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 122 days.

(21) Appl. No.: 10/220,565

(22) PCT Filed: Feb. 20, 2001

(86) PCT No.: PCT/EP01/01917

§ 371 (c)(1),
(2), (4) Date: Dec. 30, 2002

(87) PCT Pub. No.: WO01/65739

PCT Pub. Date: Sep. 7, 2001

(65) Prior Publication Data

US 2003/0147125 A1 Aug. 7, 2003

(30) Foreign Application Priority Data

Mar. 3, 2000 (EP) ........................................... 00104715

(51) Int. Cl.$^7$ ............................................... H01S 3/00
(52) U.S. Cl. ............................................... 359/341.41
(58) Field of Search ...................... 359/341.41, 341.42

(56) References Cited

U.S. PATENT DOCUMENTS

| | | | |
|---|---|---|---|
| 5,664,131 A | | 9/1997 | Sugiya |
| 5,812,710 A | * | 9/1998 | Sugaya .......................... 385/27 |
| 6,366,393 B1 | * | 4/2002 | Feulner et al. ............... 359/337 |
| 6,433,925 B1 | * | 8/2002 | Sakano et al. .......... 359/341.43 |

FOREIGN PATENT DOCUMENTS

| | | | |
|---|---|---|---|
| EP | 0 942 548 A2 | 9/1999 | ............. H01S/8/00 |
| WO | WO 97/37444 | 10/1997 | ............. H01S/8/00 |

OTHER PUBLICATIONS

Hansen, S.L. et al., "Experimental Verification of New EDFA Gain–Tilt Distortion Theory" IEEE Photonics Technology Letters, US, IEEE Inc., New York, vol. 5, No. 12, 1993, pp. 1433–1435.

* cited by examiner

*Primary Examiner*—Thomas H. Tarcza
*Assistant Examiner*—Deandra M. Hughes
(74) *Attorney, Agent, or Firm*—Nixon & Vanderhye P.C.

(57) ABSTRACT

An optical amplifier arrangement is provided that includes an amplifier (10) elements for measuring the gain applied to the total input power (21, 31, 40) and a control unit (50) adapted to determine the degree of variation of gain with wavelength, i.e. the gain tilt, on the basis of a measurement of total gain. This is achieved by using a predetermined relationship between the wavelength dependent gain variation and total gain. This relationship is determined on production by measurement of the amplifier or of a batch or class of amplifiers. In this way a precise figure for gain tilt is provided for each amplifier. This may be used to eliminate gain tilt. Alternatively, if the system requirements tolerate limited gain tilt, the figure may be used to monitor the system.

24 Claims, 3 Drawing Sheets

GAIN CONTROL IN OPTICAL AMPLIFIERS

This application is the US national phase of international application number PCT/EPO1/01917, filed on Feb. 20, 2001, which claims priority to EP Application No. 00104715.8 filed 3 Mar. 2000. The entire contents of these applications are incorporated herein by reference.

FIELD OF INVENTION

The invention relates to optical amplifiers. It has specific relevance to optical amplifiers employed in broadband optical networks, such as WDM communication networks and the like.

BACKGROUND ART

Optical amplifiers, a term which includes the optical fibre amplifiers such as Erbium doped fibre amplifiers, fluoride doped fibre amplifiers, Erbium Ytterbium amplifiers, Raman amplifiers, Brillouin amplifiers as well as semiconductor amplifiers, solid state amplifiers and the like, are commonly employed in optical wavelength multiplexed (WDM) transmission systems as they are capable of amplifying multiple WDM channels simultaneously.

These amplifiers are typically operated in a saturated condition, that is, with an output power that is independent of the input power. The amplifier gain is thus dependent on the input power. This configuration allows each amplifier placed along the transmission path to automatically adjust its gain to compensate for losses along the line.

The amplifiers are generally designed to operate at a substantially flat spectral gain, hereafter referred to as the optimal gain, for a specified input power. However, variations within production margins and within the gain matching requirements of the system into which it is to be installed may result in the amplifier having a different optimal gain from that specified. Other factors such as temperature variations and the characteristics of other components in the amplifier may also affect the optimal gain of the amplifier. In addition to the various factors that alter the optimal gain, an amplifier installed in an optical communications system may well be constrained to operate at a non-optimal gain. Reasons for this could include variations in the actual span attenuations that the amplifier must compensate for and variations in the power levels in the traffic channels. A variations in the number of channels could also change the amplifier operating gain particularly when the amplifier does not have information about the number of channels present.

A problem with this type of amplifier operation is that the gain experienced at different input signal wavelengths depends on the population inversion, which in turn depends on the amplification. Generally, an increased population inversion will cause an increased gain at shorter wavelengths with the reverse effect occurring at reduced population inversion. In other words, a slope or tilt is present in a curve of gain against wavelength within the bandwidth of amplifier operation. Thus the relative gain between the different WDM channels depends directly on the amplification of the amplifier. These gain variations cause an imbalance in gain between channels, which leads to different signal to noise ratios at the receiver.

While this gain variation over wavelength may not be critical in a system carrying signals of a limited bandwidth, the impact is more serious for WDM systems which commonly carry 80 channels spread over 30 nm. In such a system, the difference in signal to noise ratio between the best and worst channels will be large. Since the channel manifesting the lowest signal to noise ratio sets the limit for the performance of the whole system, this implies that the system must operate well below its full capacity.

International patent application WO9836513 describes an optical amplifier that is able to amplify an optical signal without introducing a gain tilt. This is achieved by using two optical amplifiers in series, between which an attenuator is connected. The amplifiers are identically constructed and are assumed to have identical gain spectrums. The gain of each amplifier expressed in dB is assumed to be a linear combination of the gain at two known wavelengths for a fixed pump power and input power. By adjusting the attenuation of the signal power between the amplifiers, the gain of the second amplifier can be selected to apply an equal but opposite gain tilt to the input signal. A disadvantage of this known arrangement is that while the two amplifiers may be designed to have identical spectral gains, the value obtained in production may vary with the result that an unknown gain tilt will be introduced between traffic channels. While the system as a whole may tolerate a small gain tilt between channels, the accumulated gain tilt generated by cascaded amplifiers is likely to introduce unacceptable variations in the SNR of different channels. Furthermore, such an amplifier arrangement is relatively costly and requires the measurement of the pump power of the amplifiers in addition to the input and output powers.

It is an object of the present invention to provide an optical amplifier arrangement and method for controlling the same which overcomes the problems associated with prior art apparatus.

It is a further object of the present invention to provide an optical amplifier arrangement and method for controlling the same that enables gain tilt to be reliably controlled over an optical transmission path.

It is another object of the present invention to provide an optical amplifier arrangement and method for controlling the same that enables gain tilt to be controlled at relatively low cost.

SUMMARY OF INVENTION

An optical amplifier is provided that includes a control unit adapted to determine the degree of variation of gain with wavelength, i.e. the gain tilt, on the basis of a measurement of total gain. This is achieved by using a predetermined relationship between the wavelength dependent gain variation and total gain. This relationship is determined on production by measurement of the amplifier or of a batch or class of amplifiers.

Preferably, this relationship models the dependence of gain tilt on the deviation of total gain from an optimal gain. The optimal gain value is likewise measured for the amplifier or class of amplifiers on production. The optimal gain is the gain experienced by the total input power at which all wavelengths contained in the input signal are subjected to substantially the same amplification.

In this way a precise figure for gain tilt is provided for each amplifier. This may be used to, eliminate gain tilt. Alternatively, if the system requirements tolerate limited gain tilt, the figure may be used to monitor the system.

For a more accurate determination of gain tilt, the optimal gain may further be modelled as a function of temperature. Thus with the additional measurement of temperature, the gain tilt at the amplifier output may be ascertained by adjusting the optimal gain according to the temperature measurement and then deriving the gain tilt from the gain offset.

Preferably the amplifier is adapted to communicate the gain tilt figure to downstream and upstream components. Thus a link comprising this type of optical amplifier can be adapted to maximise the signal to noise ratio at the receivers in accordance with the accumulated gain tilt communicated by the amplifiers.

An optical link comprising amplifiers of the type defined above may alternatively include a tilt control arrangement, for example including an attenuator with a controllable spectral tilt, controllable spectral filters or equalisers and the like.

In a preferred embodiment of the invention, the gain tilt in an optical fibre link can be controlled using an amplifier arrangement having two amplifiers as described above arranged in series but separated by an attenuator, possibly with a controllable spectral tilt, or a spectral filter. The gain tilt for each amplifier can be accurately determined as described above. By altering the attenuation of the attenuator and thus the input power to the second amplifier, the gain of the second amplifier may be selected to generate a specified gain tilt. This value of gain tilt may be equal but opposite to that generated by the first amplifier. Alternatively, the gain tilt may be of a magnitude and sign to cancel out gain tilt introduced further upstream of the optical link by other amplifiers.

Gain tilt introduced by downstream amplifiers may also be cancelled out in bi-directional systems by making information about the accumulated gain tilt in a signal received at an end node available to the dual amplifier units through the return path of the data channel.

In this way the gain tilt along an optical link may be eliminated while the number of relatively costly double stage amplifiers is kept to a minimum.

In an alternative arrangement of this double amplifier arrangement the gain of both the first and second amplifiers are adjusted such that they operate at their respective optimal gains. The gain of the first optical amplifier is adjusted by altering the pump power injected into the amplifier. The second amplifier is preferably operated in saturation. Its gain is preferably adjusted by adjusting the attenuator to change the amplifier input power, but it may also be adjusted by appropriate control of the pump power.

BRIEF DESCRIPTION OF THE DRAWINGS

Further objects and advantages of the present invention will become apparent from the following description of the preferred embodiments that are given by way of example with reference to the accompanying drawings. In the figures.

DETAILED DESCRIPTION OF THE DRAWINGS

Figure 1:
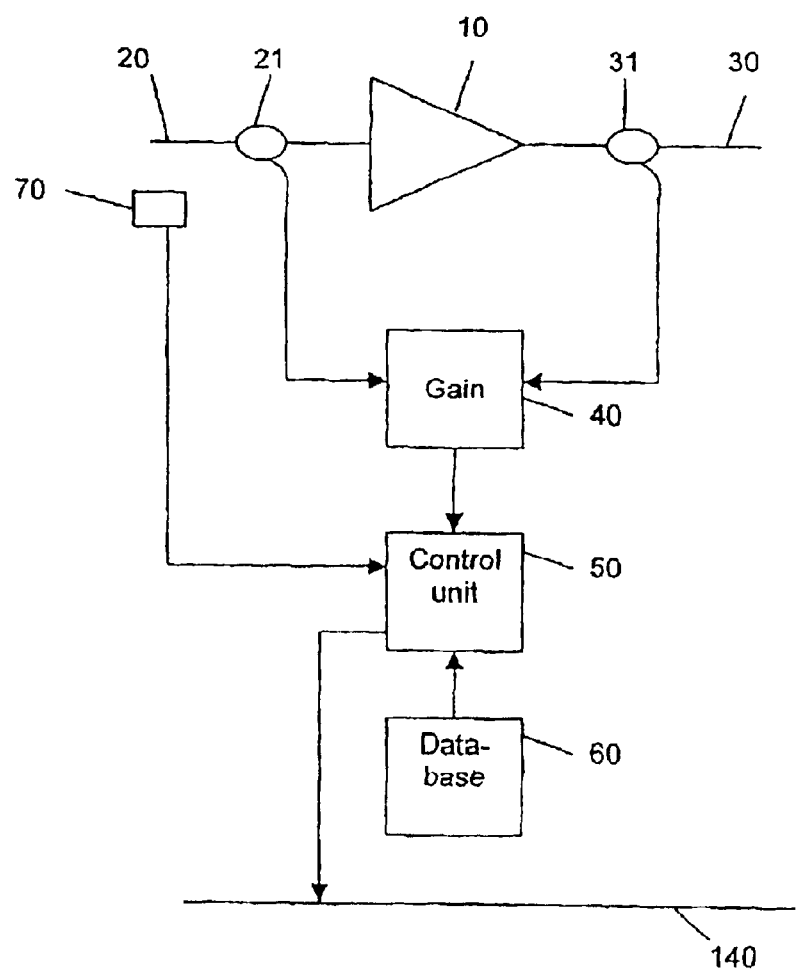
FIG. 1 schematically depicts an amplifier arrangement according to an embodiment of the present invention.

The optical amplifier arrangement shown in FIG. 1 includes an optical amplifier 10 connected to a first optical fibre 20 for carrying optical input signals and a second optical fibre 30 for carrying optical output signals. The optical amplifier is an active fibre amplifier such as a rare earth doped fibre, Raman amplifier, Brillouin amplifier or the like. The amplifier gain is controlled by one or more optical pumps that inject light power into the active fibre to alter the degree of population inversion. An optical coupler 21 is spliced to the input fibre 20 for extracting a portion of the input signal power. A second optical coupler 31 is likewise spliced to the output fibre 30 for extracting a portion of the output signal power. These extracted signals are a measure of the total input and output powers to the amplifier 10. The first and second couplers 21, 31 are connected to a first gain calculator 40 which calculates the gain of the amplifier using the measured signal powers.

In a preferred embodiment, the gain calculator includes a software controlled processing unit. It will thus be appreciated that the optical signals extracted by the couplers 21, 31 are converted to electrical signals by suitable opto-electric converters, such as photodetectors or the like, and subsequently subjected to appropriate pre-processing operations prior to being used for the gain calculation.

The calculated gain value is passed to a control unit 50, which uses this value to determine the deviation from the optimal gain of the amplifier. With this deviation value, the control unit 50 then determines a linear approximation of the variation of gain with wavelength or the gain tilt. This is done either by calculation using predetermined relationship of gain tilt with deviation from optimal gain, or by accessing a database 60 or lookup table containing a predetermined set of values of gain tilt. This predetermined relationship is obtained for the amplifier or for a class of amplifiers as described below with reference to FIGS. 2 to 4.

Figure 2:
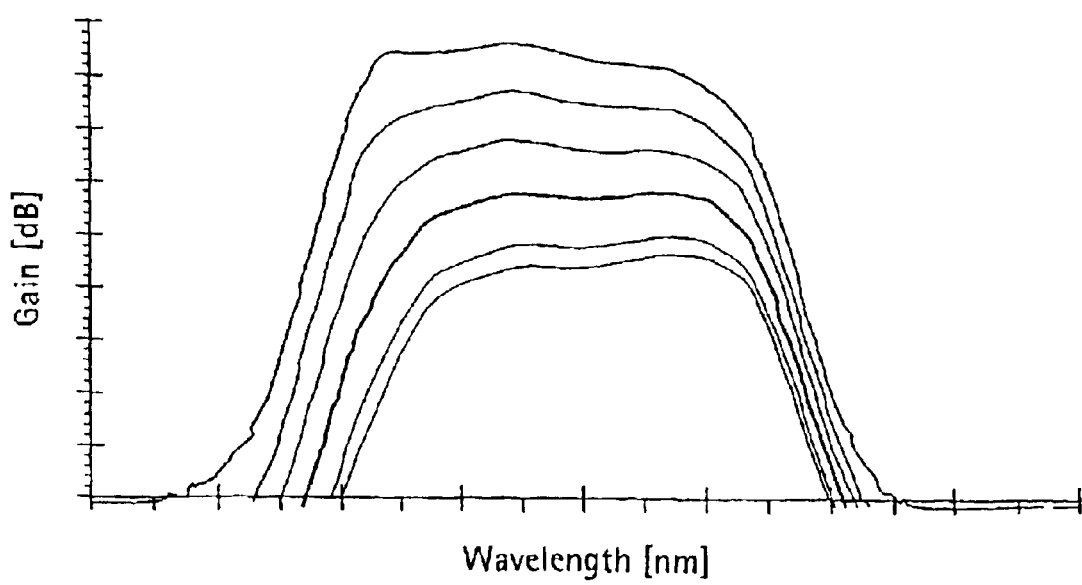
FIG. 2 is a graph showing the relationship between gain and wavelength for an optical amplifier.

FIG. 2 shows a graph of the relationship between gain and wavelength for different values of gain. In this graph, the optimal gain is shown in bold. The optimal gain of an amplifier is the value of total gain, i.e. the ratio of the total output power to the total input power, at which the gain variation with wavelength is minimum, such that all signal wavelengths passing through the amplifier experience substantially the same gain. Ideally the optimal gain should be flat for all wavelengths within the bandwidth of interest. However, a ripple will always be present for example owing to fibre characteristics and also to passive components used in the amplifier. In addition to this ripple, it can be seen from the graph in FIG. 2 that a slope or tilt is apparent in the gain curve when the gain deviates from the optimal gain. At values of gain that are higher than the optimal gain the amplification at shorter wavelengths exceeds that at longer wavelengths. The opposite effect is observed at gain values that are lower than the optimal gain.

Amplifiers are generally designed with an operating gain in mind. However, manufacturing tolerances frequently mean that the actual optimal gain obtained on production differs from the specified gain. The measurements of gain in dB against wavelength as shown in FIG. 2 are thus preferably performed on or after production. Preferably, these measurements are performed once for a class of amplifiers. However, more accurate values are obtained when the optimal gain is measured for a batch of amplifiers on production, while a more accurate model still is obtained when the optimal gain for each amplifier is modelled separately.

Figure 3:
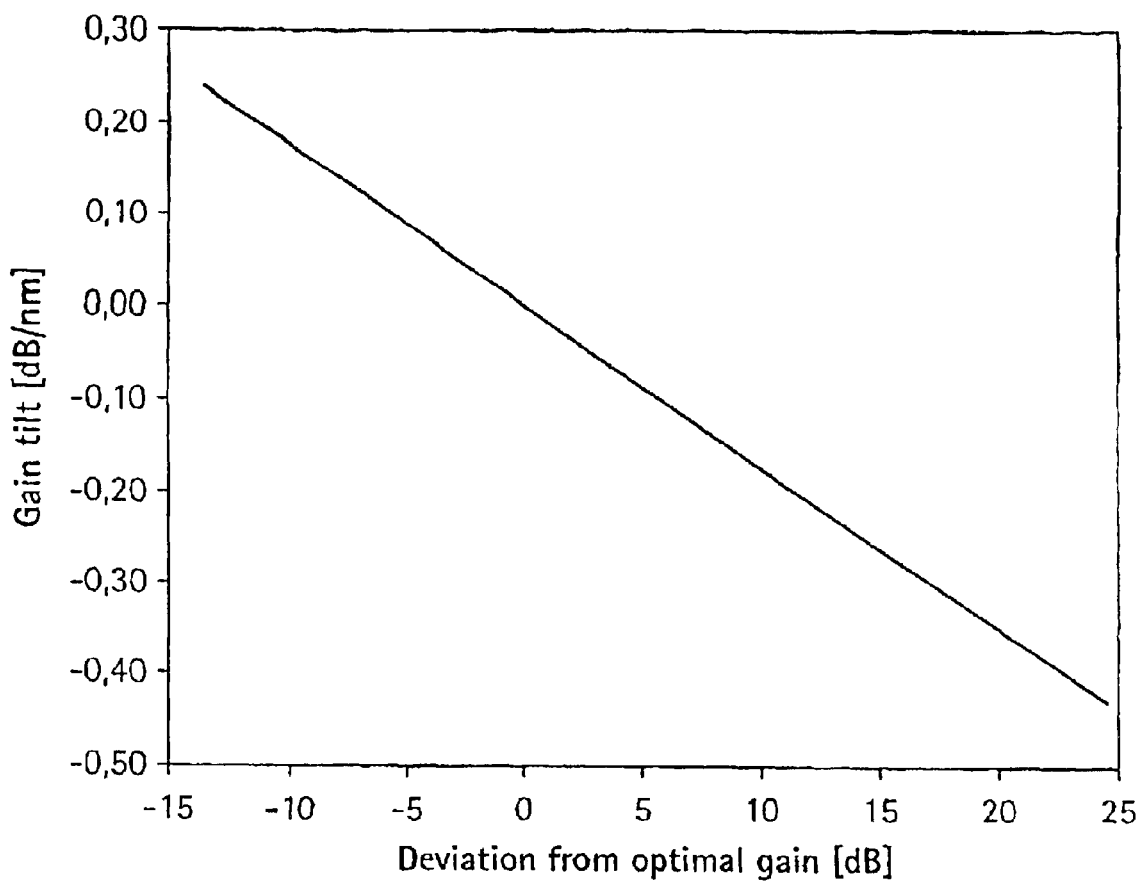
FIG. 3 is a graph illustrating the variation of the gain tilt with the deviation from optimal gain for an optical amplifier to a first linear approximation.

The relationship between gain tilt observed in FIG. 2 is then modelled against the deviation of gain from the optimal gain as illustrated graphically in FIG. 3. The gain tilt is expressed in decibels per nanometer (dB/nm). The illustrated relationship is depicted as a linear approximation. This linear relationship may be expressed as a formula, which is then used by the control unit 50 to calculate the gain tilt at the real operating gain of the amplifier. It will be understood that the dependence of gain tilt on the offset from optimal gain may be represented by a more complex and accurate model, in which case it may be simpler to provide discrete values of gain tilt for numerous values of offset from optimal gain in a database or lookup table 60 as shown in FIG. 1.

The linear approximation between deviation from optimal gain and gain tilt enables a simple manner of calculating the approximate gain tilt for any given gain. However, if a more complex, and thus more accurate, relationship is modelled, for example using a database or lookup table, this may also be expressed in terms of the direct relationship between total amplifier gain and gain tilt.

Figure 4:
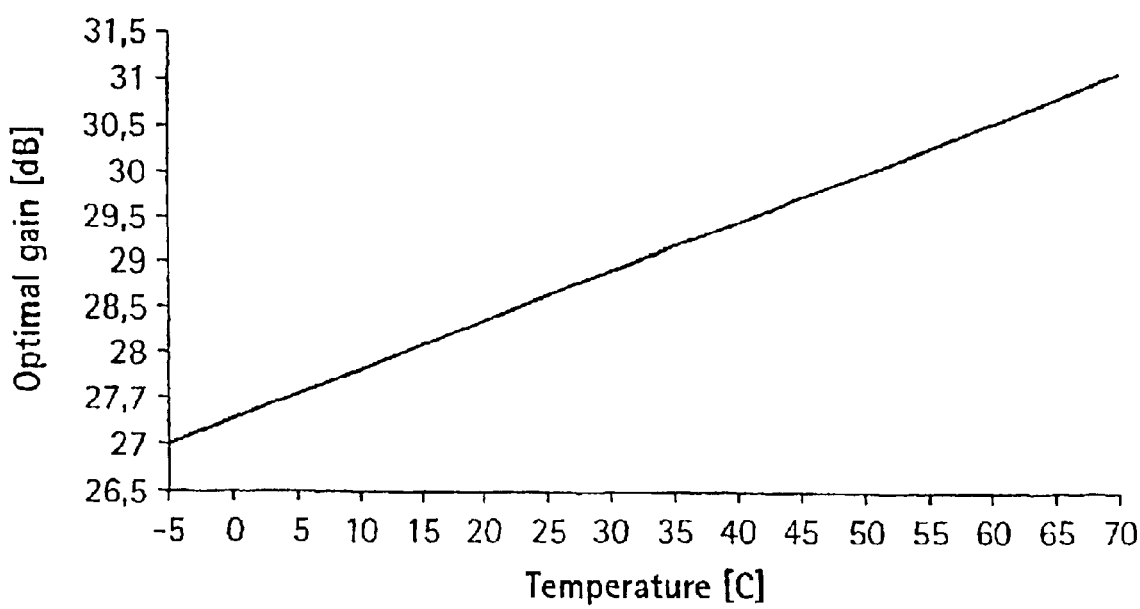
FIG. 4 is a graph showing the relationship between the optimal gain of an optical amplifier and temperature.

In addition to determining the real optimal gain of the amplifier, the temperature dependence of optimal gain in dB may also be determined and modelled. FIG. 4 shows a graph of the linear approximation of the variation of optimal gain with temperature.

The effects of other factors that may alter the optimal gain of the amplifier, such as passive components contained in the amplifier arrangement, may also be incorporated in the model.

In this case, the gain tilt of the optical amplifier 10 of FIG. 1 can be determined simply by performing a temperature measurement to determine the valid optimal gain value, followed by a measurement of the actual gain, i.e. the ratio of the total output power to the total input power, to determine the deviation from the optimal gain and hence the gain tilt.

In the arrangement of FIG. 1 the temperature measurement is performed by a sensor 70. The exact nature of a suitable sensor is well known to the person skilled in the art and will not be described here.

While in FIG. 1 the gain calculator 40 and control unit 50 are depicted as separate elements, it will be understood that the functions performed by these elements may be carried out by a single processing unit that contains the necessary processing power in the form of a microprocessor, minicomputer or the like. The processing elements or element may be incorporated in the amplifier arrangement and be dedicated to this amplifier arrangement. Alternatively, the processing means may instead be arranged at a network node or even a more central location and perform the necessary processing for a number, or all of the amplifier arrangements. When the variation of gain tilt with deviation from optimal gain is implemented as a database or lookup table, this may likewise be arranged with the processing element or alternatively a central database containing the modelled relationship for one or several amplifier classes could be provided centrally for access by all control units.

It will be appreciated that an amplifier comprising more than one amplifier stage, such as an amplifier with a mid-stage access, a dual pumped multistage amplifier and the like, the above measurements and models may be made for the amplifier as a whole or for the individual stages of the amplifier.

When installed in an transmission link of an optical network, the amplifier arrangement 10 is preferably connected via the control unit 50 to a control channel 140. This control channel 140 may be a separate dedicated electrical or optical cable as depicted in FIG. 1. Alternatively this channel can be carried on the traffic fibre. The control channel 140 communicates with network control or management circuitry located at one or more nodes or at a central location in the network. Once the control unit 50 has determined the gain tilt generated by the amplifier 10, it can transmit this information onto the control channel 140 for monitoring purposes. In this way network may be configured to tolerate the accumulated gain tilt generated by each amplifier along an identified link by maximising the signal to noise ratio at the receivers. The gain tilt information may also be used for alarm purposes.

Figure 5:
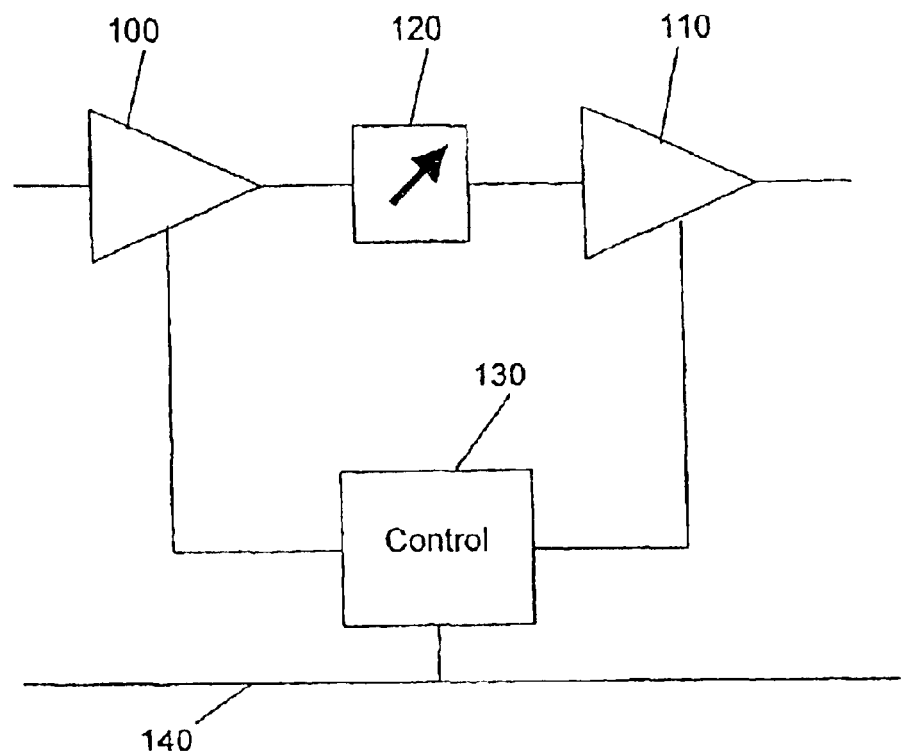
FIG. 5 schematically depicts an amplifier arrangement according to a second embodiment of the present invention.

Turning now to FIG. 5, there is depicted a dual stage amplifier having first and second amplifier stages 100, 110 each of the same construction as the arrangement depicted in FIG. 1. For the sake of clarity, the optical couplers, gain calculator, control unit, temperature sensor and database, if applicable, are incorporated in a single control block denoted by 130 for both first and second amplifier stages 100 and 110. An attenuator 120 is connected between first and second amplifiers 100, 110. The control block 130 is further connected to the attenuator 120 and controls the attenuation applied to the signal between first and second amplifiers. The attenuator 120 preferably applies a constant attenuation to all signal wavelengths entering the amplifier arrangement, but may also be arranged to apply a controllable spectral tilt. This spectral tilt may be obtained by adjusting the attenuator itself, such that it operates as a spectral filter, or by connecting a spectral filter in series.

This arrangement may be operated in two fashions.

In a first configuration the amplifier arrangement is operated at optimal gain such that the variation of gain with wavelength is substantially eliminated. This is achieved as follows. For the first amplifier 100, the control block 130 calculates the real gain from the measurement of the total input power and total output power to this amplifier 100. This value of gain is then compared with the optimal gain for the amplifier or amplifier type. The optimal gain is obtained as described above, if necessary subsequent to a temperature adjustment. However, any deviation between the real gain and optimal gain is not used to calculate the gain tilt. Rather if a deviation is ascertained, the control block 130 adjusts the pump power to the amplifier 100 to adjust the actual amplifier gain until the gain reaches the optimal value. In this way the gain tilt of the signal generated at the output of this first amplifier stage 100 is substantially zero. The second amplifier stage 110 is preferably operated in saturation such that the output power meets system requirements. Thus the total gain of this amplifier 110 is dependent only on the input power. In order to reduce, and preferably eliminate, the gain tilt generated by this second amplifier 110, the control block 130 controls the attenuator 120 to apply the required attenuation to the output signal of the first amplifier 100 to ensure that the second amplifier 110 also operates at optimal gain. The control block 130 may also adjust the gain of the second amplifier 110 by altering the pump power the second amplifier instead of, or in addition to, altering the attenuation. In this way, the total output power of the dual stage amplifier arrangement will be substantially the same for all WDM channels.

Since each amplifier 100, 110 is adjusted independently of the other, the amplifiers do not need to be of the same construction.

In a second mode of operation, the control block 130 leaves the amplifier gain unchanged and merely determines the gain tilt of the first optical amplifier 100, as described above with reference to FIGS. 1 to 4. As for the previous mode of operation, the second amplifier 110 is preferably operated in saturation. The gain of the second amplifier 110 can then be adjusted by the control block by altering the attenuation applied to the output of the first amplifier 100. Since the gain tilt of the first amplifier 100 is known, the control block 130 can determine the gain, or the deviation from nominal gain, required to cause the second amplifier 110 to generate an equal but opposite gain tilt. The control unit 130 thus adjusts the input power to the second amplifier using the attenuator 120 to obtain a value of gain at which the gain tilt at the output of the dual stage amplifier is the same as that at the input. Alternatively, or in addition, the control block 130 may adjust the gain of the second amplifier 110 directly by altering the pump power.

It will be understood that the amplifiers 100, 110 do not need to be of the same construction for this mode of operation either, providing that the gain tilt generated by the first amplifier can be simulated with an opposite sign by the second amplifier.

It is further possible with this arrangement to compensate not just for the gain tilt generated by the first amplifier stage 100 in this amplifier device, but also for that generated by optical amplifiers connected upstream in an optical link.

Figure 6:
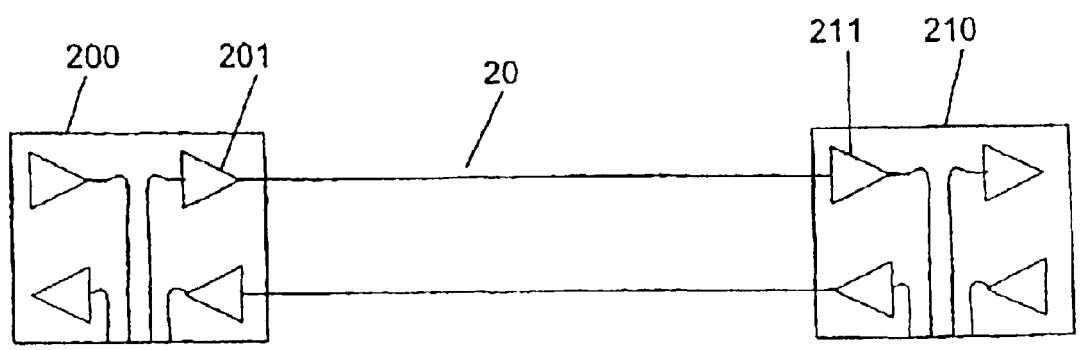
FIG. 6 schematically illustrations a portion of a WDM optical network.

FIG. 6 shows a portion of a WDM optical transmission network. An optical link in this network includes a first node 200 and a second node 210. An amplifier, or preamplifier 201 is arranged in the first node. This amplifier 201 is preferably of identical configuration to that shown in FIG. 1. The amplifier is 201 amplifies the signals at the node and transmits them onto an optical fibre 20. At the second node a power amplifier 211 receives the signals on the optical fibre 20. The power amplifier is a dual stage amplifier constructed as described above with reference to FIG. 5. The amplifiers 201, 211 are furthermore connected via a control channel 140 (FIGS. 1 and 5) via which the control block 130 of the power amplifier 211 receives data relating to the gain tilt generated by preamplifier 201. It will be appreciated that further amplifiers may be connected along the link and also coupled to the control channel 140. In this case the control block 130 calculates the total or accumulated gain tilt generated by all upstream amplifiers and adjusts the amplifier gain of the power amplifier 211 to cancel out this tilt. In some configurations it may be preferably to compensate for gain tilt at several points along a transmission path. By compensating for gain tilt at intervals only, the number of relatively expansive and complex dual stage amplifiers can be kept to a minimum while ensuring that the traffic channels have substantially the same power.

In addition to providing the control block 130 with data concerning gain tilt, the control channel 140 may also be used to provide information on the relative gains applied to each traffic channel to network management circuitry.

As discussed above with reference to FIG. 1, by allowing the gain tilt to be accurately quantified, there may be no need for gain tilt compensation. A network may instead be designed to tolerate certain known gain variations between the traffic channels.

It will be understood that the dual stage amplifier arrangement described with reference to FIG. 5 constitutes just one possibility of adjusting the gain tilt along an optical transmission path. Other spectral tilt control units that may be substituted for these dual stage amplifiers in an network include, but are not limited to attenuators with controllable spectral tilt, controllable spectral filters and controllable spectral equalisers. It will further be understood that any element applying a wavelength dependent attenuation or filter function to the traffic signals could also be manually controlled.

While the compensation for gain tilt has been described with reference to a uni-directional link, it will be appreciated that it such an arrangement may also be applied to bi-directional systems or systems having at least bi-directional data channels. A bi-directional system is understood to comprise both systems wherein single fibres are used to transfer data in two directions as well as systems wherein separate uni-directional fibres share the same nodes and have the same terminal points. In such a bi-directional system, the dual stage amplifier described with reference to FIG. 5 or other suitable gain tilt control unit may be configured to both correct the gain tilt generated by upstream amplifiers and correct or anticipate the gain tilt introduced by amplifiers connected downstream in the direction of traffic flow. This is achieved by calculating the accumulated gain tilt on a link at an end node. This information is then fed back to the units adapted to control the spectral tilt using either the control channel 140 or alternatively the data channel of the return path. The units are then adjusted to eliminate the spectral tilt or alternatively to maximise the signal to noise ratio obtainable at the receiver. The ability to control gain tilt introduced both upstream and downstream of a tilt control unit means that the number of these units can be minimised and also that their position in the network optimised.

While the invention has been described with specific reference to active fibre amplifiers, it will be understood that it is also applicable to other types of optical amplifiers, such as semiconductor amplifiers or solid state amplifiers.

What is claimed is:

1. An optical amplifier arrangement for amplifying input signals within a predetermined wavelength band, comprising:

an optical amplifier;

means for measuring the input power to the optical amplifier;

means for measuring the output power from the amplifier;

means for determining total amplifier gain from said input and output powers; and means for determining the degree of variation of gain with wavelength using a predetermined relationship between total gain and the slope of gain with wavelength.

2. An arrangement as claimed in claim 1, wherein said predetermined relationship models the slope of gain with wavelength against the deviation of actual amplifier gain from a known optimal gain value at which amplifier gain is substantially equal for all wavelengths in said wavelength band, and including means for determining the deviation of said determined gain from said optimal gain value.

3. An arrangement as claimed in claim 2, further comprising:

means for measuring the temperature of said optical amplifier, and means for determining the optimal gain of the amplifier from a predetermined relationship between the optimal gain of the amplifier and amplifier temperature prior to determining the gain slope with wavelength.

4. An arrangement as claimed in claim 1, predetermined relationship is specific to said optical amplifier.

5. An arrangement as claimed in claim 1, wherein said predetermined relationship is specific to a class of optical amplifiers.

6. An optical amplifying device, comprising:

first and second optical amplifiers;

attenuating means connected between said first and second optical amplifiers;

means for measuring the gain of each amplifier;

means for determining for each optical amplifier the degree of variation of gain with wavelength using a predetermined relationship between total amplifier gain and the slope of gain with wavelength; and means for adjusting the pump power to said first amplifier and/or the attenuation of said attenuator and/or the pump power to said second optical amplifier to adjust the gain of at least one of said amplifiers.

7. A device as claimed in claim 6, wherein said predetermined relationship models the slope of gain with wavelength against the deviation of actual amplifier gain from an optimal gain value at which amplifier gain is substantially equal for all wavelengths in said wavelength band, wherein said adjusting means is arranged to alter the pump power to said amplifiers or the attenuation of said attenuator to minimize the deviation of said measured gain from said optimal gain value for each amplifier.

8. A device as claimed in claim 6, further comprising:

means for measuring the temperature of said optical amplifiers, and means for determining the optimal gain of the amplifiers from a predetermined relationship between the optimal gain of the amplifier and amplifier temperature prior to determining the gain slope with wavelength.

9. An optical transmission link of an optical fibre network adapted to carry wavelength division multiplexed signals, comprising:

an optical fibre for carrying traffic data in at least one direction, and at least one optical amplifier coupled to said optical fibre for amplifying the signal power of said traffic data, including:

means for measuring total amplifier gain, and means for determining the degree of variation of gain with wavelength from a predetermined relationship between total amplifier gain and the slope of gain with wavelength.

10. A transmission link as claimed in claim 9 further comprising:

a control channel coupled to said at least one amplifier for carrying information relating to the determined degree of variation of gain with wavelength.

11. A transmission link as claimed in claim 10 further comprising:

controllable wavelength dependent attenuating means coupled to said optical fibre and said control channel, said attenuating means being adapted to attenuate select wavelengths of the traffic data in response to information relating to the determined degree of variation of gain with wavelength received via said control channel.

12. A link as claimed in claim 11, wherein said wavelength dependent attenuating means includes:

an amplifying device having first and second optical amplifiers;

an attenuator connected between said first and second optical amplifiers;

means for determining for each optical amplifier the degree of variation of gain with wavelength from a predetermined relationship between total amplifier gain and the slope of gain with wavelength; and means for controlling the attenuation of said attenuator and/or the gain of said second optical amplifier to generate a signal at the output of said device having a specified degree of variation of gain with wavelength.

13. A link as claimed in claim 12, wherein said attenuator is adapted to apply wavelength dependent attenuation to said traffic data.

14. A link as claimed in claim 9, wherein said predetermined relationship models the slope of gain with wavelength against the deviation of actual amplifier gain from a known optimal gain value at which amplifier gain is substantially equal for all wavelengths in said wavelength band, said amplifier including means for determining the deviation of said determined gain from said optimal gain value.

15. A link as claimed in claim 9, further comprising:

means for measuring the temperature of said optical amplifier, and means for determining the optimal gain of the amplifier from a predetermined relationship between the optimal gain of the amplifier and amplifier temperature prior to determining the gain slope with wavelength.

16. A method for determining the degree of variation of gain with wavelength applied to optical WDM signals amplified in an optical amplifier, comprising:

measuring the total power output by the amplifier;

measuring the total power input to the amplifier;

calculating the total amplifier gain; and using a predetermined relationship between total gain and degree of variation of gain with wavelength, determining the wavelength dependent variation for the calculated total gain.

17. A method as claimed in claim 16, further comprising:

determining the deviation of said calculated gain from a predetermined optimal gain value for said amplifier, and using a predetermined relationship between the deviation from said optimal gain and the degree of variation of gain with wavelength to determine the wavelength dependent variation for the calculated gain.

18. A method as claimed in claim 16, further comprising:

determining factors that affect the value of optimal gain, such as temperature, and adjusting the optimal gain in accordance with said determined factors prior to determining the wavelength dependent variation for the calculated gain.

19. An optical amplifier arrangement for amplifying input signals within a predetermined wavelength band, comprising:

an optical amplifier;

a first detector for measuring the input power to the optical amplifier;

a second detector for measuring the output power from the amplifier;

first electronic processing circuitry for determining total amplifier gain from said input and output powers; and second electronic processing circuitry for determining the variation of gain with wavelength using a predetermined relationship between total gain and the slope of gain with wavelength.

20. An arrangement as claimed in claim 19, wherein said predetermined relationship models the slope of gain with wavelength against the deviation of actual amplifier gain from a known optimal gain value at which amplifier gain is substantially equal for all wavelengths in said wavelength band, where the second electronic processing circuitry is configured to determine the deviation of said determined gain from said optimal gain value.

21. An arrangement as claimed in claim 19, further comprising:

a third detector for measuring the temperature of said optical amplifier, wherein the second electronic processing circuitry determines the optimal gain of the amplifier from a predetermined relationship between the optimal gain of the amplifier and amplifier temperature prior to determining the gain slope with wavelength.

22. An optical amplifying device, comprising:

first and second optical amplifiers;

an attenuator connected between said first and second optical amplifiers;

a detector for measuring the gain of each amplifier; and electronic circuitry configured to determine for each optical amplifier the degree of variation of gain with wavelength using a predetermined relationship between total amplifier gain and the slope of gain with wavelength and to adjust the pump power to said first amplifier and/or the attenuation of said attenuator or the pump power to said optical amplifier to adjust the gain of at least one of said amplifiers.

23. A device as claimed in claim 22, wherein said predetermined relationship models the slope of gain with wavelength against the deviation of actual amplifier gain from an optimal gain value at which amplifier gain is substantially equal for all wavelengths in said wavelength band, wherein said electronic circuitry is configured to alter the pump power to said amplifiers or the attenuation of said attenuator to minimize the deviation of said measured gain from said optimal gain value for each amplifier.

24. An optical transmission link of an optical fiber network adapted to carry wavelength division multiplexed signals comprising:

an optical fiber for carrying traffic data in at least one direction, and at least one optical amplifier in accordance with the optical amplifier coupled to said optical fiber arrangement of claim 1 for amplifying the signal power of said traffic data.

* * * * *